United States Patent [19]

Bogema et al.

[11] 4,192,196

[45] Mar. 11, 1980

[54] BLOCKED CHANGE GEAR TRANSMISSION AND IMPROVED BLOCKER AND JAW CLUTCH ASSEMBLY THEREFOR

[75] Inventors: Edward J. Bogema, Vickburg; John R. Vandervoort, Richland, both of Mich.; John R. Bevins, Bluefield, W. Va.

[73] Assignee: Eaton Corporation, Cleveland, Ohio

[21] Appl. No.: 929,377

[22] Filed: Jul. 31, 1978

[51] Int. Cl.² .......................... F16H 3/38; F16D 11/00
[52] U.S. Cl. ...................................... 74/339; 192/53 F
[58] Field of Search .......................... 74/331, 339, 372; 192/53 F, 42, 67 R

[56] References Cited

U.S. PATENT DOCUMENTS

| | | | |
|---|---|---|---|
| 2,990,044 | 6/1961 | Russell | 74/339 |
| 3,924,484 | 12/1975 | Richards | 74/339 |
| 3,983,979 | 10/1976 | Richards | 74/339 |

*Primary Examiner*—Patrick D. Lawson
*Attorney, Agent, or Firm*—R. J. McCloskey; H. D. Gordon

[57] ABSTRACT

An improved, blocked, change gear transmission having an input shaft normally driven by a one-way prime mover and an output shaft normally connected to a driven device is provided. The improved blocked transmission utilizes at least one improved blocker and jaw clutch assembly which allows engagement of a selected ratio gear under static conditions, i.e., when the driven device is at rest and the blocked transmission is in neutral.

28 Claims, 16 Drawing Figures

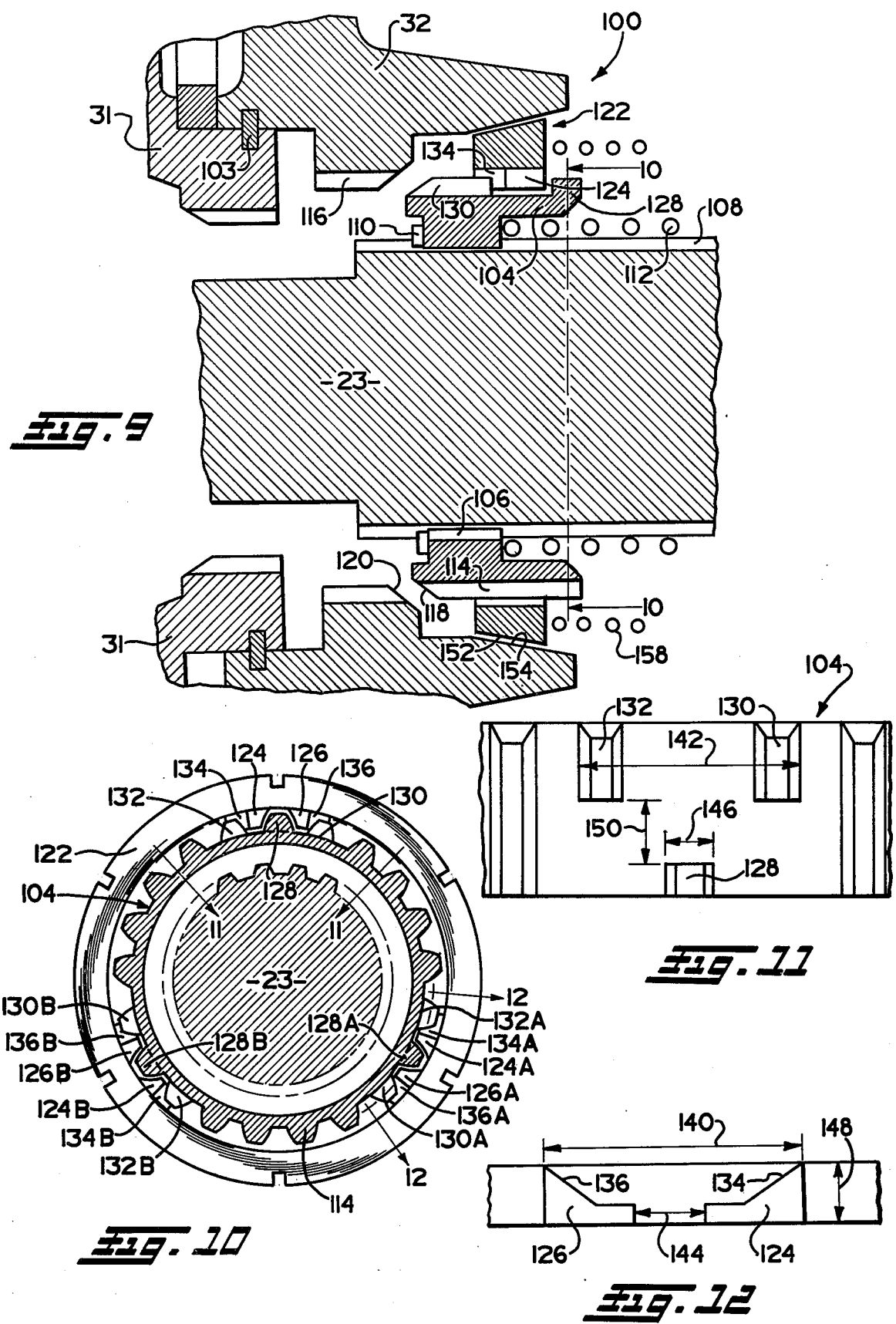

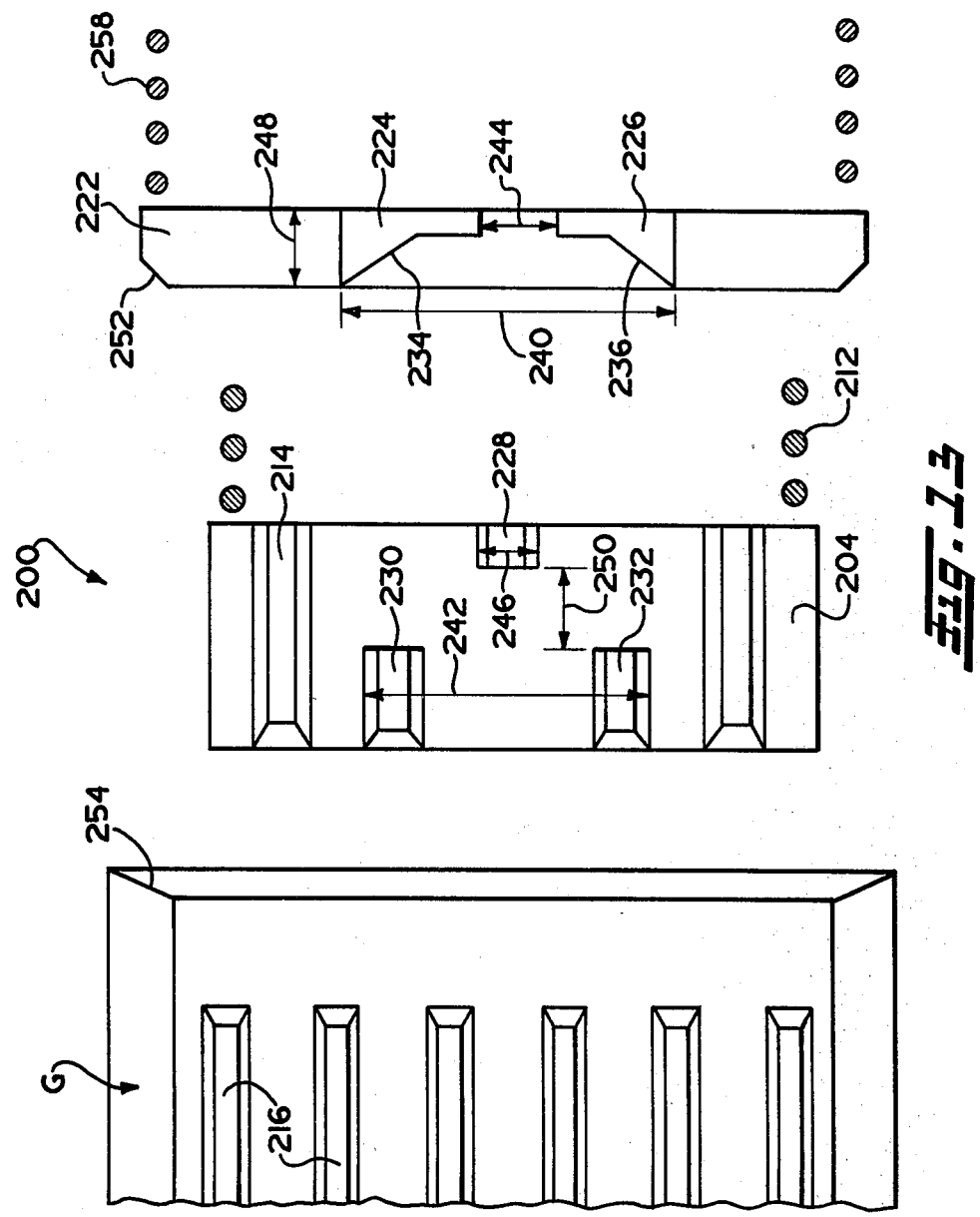

BLOCKED CHANGE GEAR TRANSMISSION AND IMPROVED BLOCKER AND JAW CLUTCH ASSEMBLY THEREFOR

BACKGROUND OF THE INVENTION

1. Field of the Invention

This invention relates to shiftable, blocked change speed gear devices, preferably multiple countershaft floating mainshaft transmissions, having resiliently yieldable shifting means utilizing blocker and jaw clutch assemblies for substantially simplifying shifting of the transmissions, and in particular relates to shiftable, blocked, change gear transmissions normally driven by one-way prime movers and utilizing improved blocker and jaw clutch assemblies effective to allow engagement of at least one selected ratio gear under static conditions.

2. Background of the Invention

In the design of transmissions, particularly heavy duty transmissions, such as for example are used in trucks, there has existed for a long time the problem of shifting the transmission to the various gear ratios, which problem is even greater when the transmission is provided with an auxiliary transmission section of the range or the splitter type for increasing the number of gear ratios. In most known transmissions, the shifting process is either relatively difficult and/or the shifting mechanism is relatively complex. Thus, there has been a continuing effort in the design of transmissions to improve the shifting, to improve the rapidity of shifting, to reduce the complexity of the shifting mechanism, and to reduce its costs. Hence, without detracting in any way from the operability or desirability of many of the shifting mechanisms previously known, it may be stated that in the present invention these general objectives are accomplished to even a greater degree than has been previously possible.

Particularly, most previously known transmissions have required a relatively high level of operator skill or necessarily utilized synchronizers, of which many different types are known, for causing the speed of the jaw or tooth clutch members to be substantially synchronized prior to permitting their interengagement during a shifting sequence from one speed ratio to another speed ratio. While the use of synchronizers does permit the shifting operation to be performed, their use, as is already known, imposes certain requirements of weight, space and power which is desirable to ease, or avoid entirely, if possible.

These and other problems incident to previously known transmissions were set forth and acknowledged in U.S. Pat. Nos. 3,799,002, entitled "TRANSMISSION WITH RESILIENTLY LOADED MAIN SHAFT GEARS"; 3,910,131, entitled "TRANSMISSION WITH SNAP SHIFT"; 3,921,469, entitled "TRANSMISSION WITH RESILIENTLY LOADED MAIN SHAFT GEARS"; 3,924,484, entitled "SENSOR UNBLOCKING RAMPS"; and 3,983,979, entitled "SENSOR UNBLOCKING RAMPS"; all hereby incorporated by reference and assigned to the same assignee as the present application. Apparatus is disclosed in the above mentioned patents which effectively meets the problems while providing a reliable, effective and efficient transmission, particularly for heavy duty use.

While both forms of the inventions disclosed in said patents, namely, those using blockers and those not using blockers, are effective for carrying out the objectives thereof, it has been noted that for the usual reasons both noise and clutch tooth wear can be minimized by the use of blockers as set forth in said patents and since the date thereof a considerable amount of investigation has been carried out related thereto, both for simplifying of the blocker structure and for improving the operation of said blockers and of transmissions utilizing same. Blockers of various types are well known in the prior art and examples thereof may be seen by reference to the above mentioned patents and to U.S. Pat. No. 3,503,280, entitled "BLOCKER DEVICE", issued to W. C. Bopp, and assigned to the assignee of this application.

Blockers of the type illustrated in the above mentioned patents are generally nondeformable devices designed to prevent, or block, the engagement of the axially engageable jaw clutch members of a jaw clutch when said members are rotating at substantially different speeds, i.e., are not substantially synchronized. Transmissions utilizing such blockers are referred to herein as "blocked transmissions". Blocked transmissions are transmissions utilizing blockers to prevent jaw clutch engagement if the members of the jaw clutch are not substantially synchronized. This is in contrast to "synchronized transmissions" which utilize synchronizer clutches to cause the jaw clutch members to be synchronized. The relatively nondeformable blockers utilized with many of the prior art blocked transmissions are generally rotationally retained on one clutch member for rotation therewith with a limited amount of relative rotation (3°-15°) provided. The one clutch member is usually that clutch member rotationally fixed to the transmission mainshaft. The blocker and the one clutch member will define an array of first projections or teeth or the like which will allow the one clutch member to move relatively axially towards the other clutch member when in alignment but will block such relative axial movement when said blocker is rotated in either the clockwise or counterclockwise direction relative to the one clutch member. The blocker is designed to be in positive frictional contact with the second clutch member during an engaging operation and will thus tend to rotate with the second clutch member. Random frictional contact will usually cause, or tend to cause, the blockers to rotate with the second clutch members at times when a clutch engagement is not attempted.

By way of example, assuming the use of a relatively nondeformable blocker as disclosed in the above mentioned prior art and that the clutch members are rotating in a clockwise direction, if the first clutch member is rotating faster than the second clutch member, upon initiation of an engaging operation the blocker will be rotated counterclockwise relative to the first clutch member and the blocker will prevent axial movement of the first clutch member towards the second clutch member. If the second clutch member is rotating faster than the first clutch member, the blocker will be rotated clockwise relative to the first clutch member and the blocker will prevent axial movement of the first clutch member towards the second clutch member. If the first clutch member initially rotates faster, then slower than the second clutch member, the blocker would, relative to the first clutch member, rotate in a clockwise direction from an initial counterclockwise rotated position relative to the first clutch member towards a relatively clockwise rotated position. During the relative rotation, for at least a limited period of time, the blocker would align with the first clutch member and cease to block axial movement thereof towards the second clutch member. Such relative movement of the clutch members and the blocker is generally referred to as "passing through synchronous". The clutch will "pass through synchronous" or "cross synchronous" as the two clutch members reach a substantially synchronous rotation, and the clutch engaging operation, or the gear shift, should be completed at this time. As the blocker is designed to be in positive frictional contact with the second clutch member only during a clutch engaging operation to prevent undue frictional wear, it is possible, under certain conditions, that the blocker can be set up on the "wrong side of synchronous" at the initiation of a clutch engaging operation, i.e., referring to the above example, rotated clockwise relative to the first clutch member when the first clutch member was rotating faster than the second clutch member or vice versa. Under such conditions, especially if the driven device is stopped, it is difficult or impossible to cause the blocker to "pass through synchronous" and the transmission cannot, without undue manipulation, be shifted into the desired gear ratio.

In a blocked transmission driven by a one-way prime mover, the blocked clutch members have an inherent problem of achieving jaw clutch engagement under certain static conditions, i.e., when the driven device is standing still and the transmission is in neutral. When a blocked transmission of the twin countershaft type, as is illustrated in U.S. Pat. Nos. 3,799,002 or 3,924,484, is in neutral with the master clutch engaged, the gearing will, for at least a period of time, rotate while the output or main shaft is stationary. The aforementioned condition tends to place the blockers in the "upshift position", i.e., that position associated with a dynamic upshift wherein the jaw clutch member rotating with the main shaft must be rotated faster than the clutch member rotating with the gearing to cause the clutch to pass through synchronous. When the gearing comes to a stop, the blockers remain in the "upshift position" and, because it is difficult and/or impossible to rotate the main shaft with the transmission in neutral, a reversing of the gearing or an auxiliary aligning of the blockers and jaw clutch members is required to achieve a jaw clutch engagement.

In compound, blocked transmissions of the type seen in U.S. Pat. Nos. 3,799,002 and 3,924,484, relative overspeeding of the auxiliary transmission gearing by the main shaft can be achieved by the operator momentarily shifting the transmission from neutral into reverse as reverse gear is normally not a blocked gear. But this is obviously an inconvenience, a highly undesirable technique, and might hamper the commercial acceptability of an otherwise highly successful transmission.

Mechanisms for selectively and/or automatically reverse rotating the mainshaft are believed to be an effective auxiliary method of obtaining clutch engagement of a blocked transmission at a static condition. However, due to manufacturing, space, cost and operational considerations, such mechanisms may not be satisfactory in certain situations.

SUMMARY OF THE INVENTION

In accordance with the present invention, many of the drawbacks of the prior art have been overcome by the provision of a blocked, change gear transmission driven by a one-way prime mover utilizing at least one improved blocker and jaw clutch assembly of the self-aligning type which is effective to allow engagement of at least one selected ratio gear in static conditions, i.e., when the transmission is in neutral and the device driven by the transmission is at rest.

The transmission preferably has an input shaft driven by a one-way prime mover through a normally engaged selectively disengageable master friction clutch, a selectively or automatically engageable input brake, a plurality of countershafts, a floating mainshaft and includes gear pairs arranged on and cooperatively between the shafts. The transmission is provided with positive clutches, preferably spring loaded jaw clutches, for selectively effecting connection to one of said shafts, preferably the mainshaft, of a selected one gear, preferably a mainshaft gear, upon the achievement of substantial synchronization between such gear and such shaft. Blockers are provided for protecting the positive clutch teeth from excessive wear during such engagement or shifting. Said blocker and jaw clutch assemblies comprise a first array of projections which will align when the jaw clutch members pass through synchronous, allowing axial engagement of the jaw clutch members. At least one of said blocker and jaw clutch assemblies includes means effective when the transmission is in neutral to cause the blocker to rotate relative to that jaw clutch member to which it is splined sufficiently to align the first array of projections on the blocker and jaw clutch member. It is understood that any relative rotation between the blocker and jaw clutch member to which it is splined resulting in alignment of the first array of projections is sufficient for purposes of the present invention. If the transmission includes an input brake, and if the input brake is engaged, the first array of projections will remain in alignment as the clutch members move axially together allowing the jaw clutch member carrying the blocker to engage the other jaw clutch member thereby engaging the selected ratio gear.

The means for causing alignment of the first array of projections comprises a second array of projections including a second projection or set of projections (or partially removed teeth) extending from one of the blocker or the jaw clutch member splined to the blocker and a pair of ramps extending from the other of the blocker or the jaw clutch member splined to the blocker. The pair of ramps comprise a pair of oppositely inclined surfaces which, when forced into contact with the second projection or set of projections with a sufficient axially directed force, will cause the first array of projections to align. A biasing means, such as a compressed spring, is provided for biasing the second set of projections towards the pair of ramps with sufficient force such that at at least static conditions, the first array of projections will be aligned. The second array of projections will interfere to limit axial movement in one direction of the blocker relative to the jaw clutch member to which the blocker is splined. The ramps and/or second projection or set of projections may be formed separately or may be integral with the projections comprising the first array of projections.

Accordingly, it is an object of the present invention to provide a new and improved blocked change gear transmission and an improved blocker and jaw clutch assembly for use therewith.

Another object of the present invention is to provide a new and improved resiliently shifted change speed blocked transmission of the type having a main shaft, a plurality of main shaft gears selectively clutchable to said main shaft, at least one countershaft and including at least one improved blocker-jaw clutch assembly wherein said improved blocker-jaw clutch assembly is effective to allow engagement of a selected gear under static conditions.

A further object of the present invention is to provide an improved blocked change gear transmission including a new and improved self-aligning blocker-jaw clutch assembly of simpler construction, greater reliability, easier utilization and/or of lower manufacturing cost which will substantially reduce or eliminate the difficulty of engaging a selected gear under static conditions.

These and other objects and advantages of the present invention will become apparent from a reading of the detailed description of the preferred embodiment taken in view of the accompanying drawings.

DESCRIPTION OF THE DRAWINGS

FIG. 9 is an enlarged fragmentary view of the improved blocker and jaw clutch assembly of the present invention taken along the line 9—9 of FIG. 10.

FIG. 10 is a sectional view of the improved blocker and jaw clutch member assembly of the present invention taken along the line 10—10 in FIG. 9.

FIG. 11 is an enlarged fragmentary view taken in the direction of arrows 11—11 in FIG. 10.

FIG. 12 is an enlarged fragmentary view taken in the direction of arrows 12—12 in FIG. 10.

FIGS. 13–16 are schematic representations of the improved blocker-jaw clutch assembly of the present invention in various relative operational positions thereof.

DESCRIPTION OF THE PREFERRED EMBODIMENT

Referring now to the apparatus in detail, it will be recognized that a detailed disclosure of both the construction and operation of blockers and blocked transmissions utilizing same has been set forth and claimed in the above mentioned patents and reference is therefore made thereto for such details.

Figure 1:
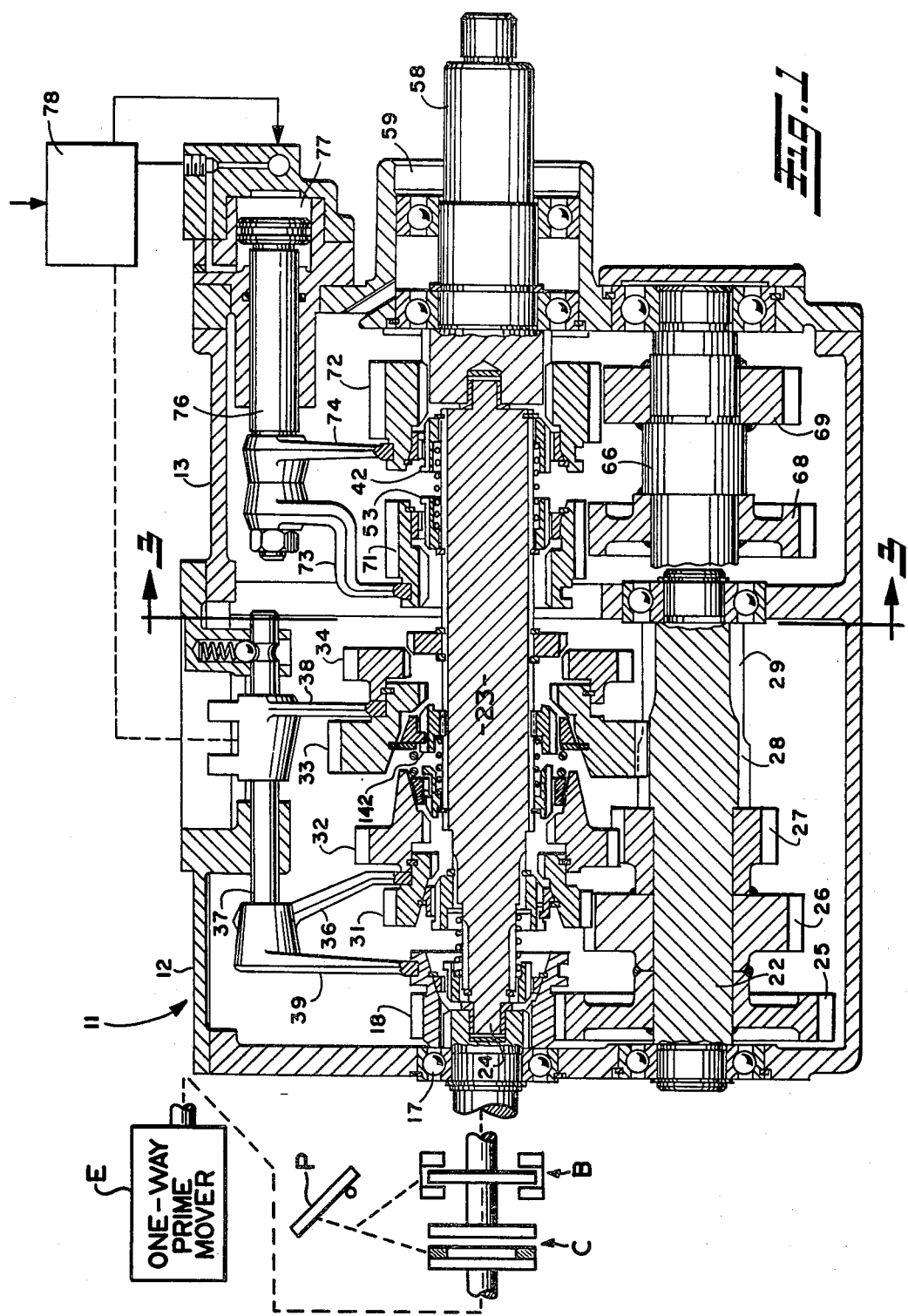
FIG. 1 is a cross-sectional view of the improved blocked transmission of the present invention utilizing improved blocker and jaw clutch assembly in connection with the positive clutch associated with at least one of the main transmission section main shaft gears, and utilizing blockers of the type described in the prior art in connection with the positive clutches associated with many of the other speed ranges, the main transmission portion thereof being taken along the line I—I of FIG. 3 and the auxiliary transmission portion thereof being taken along the line I-IA of FIG. 3.
Figure 2:
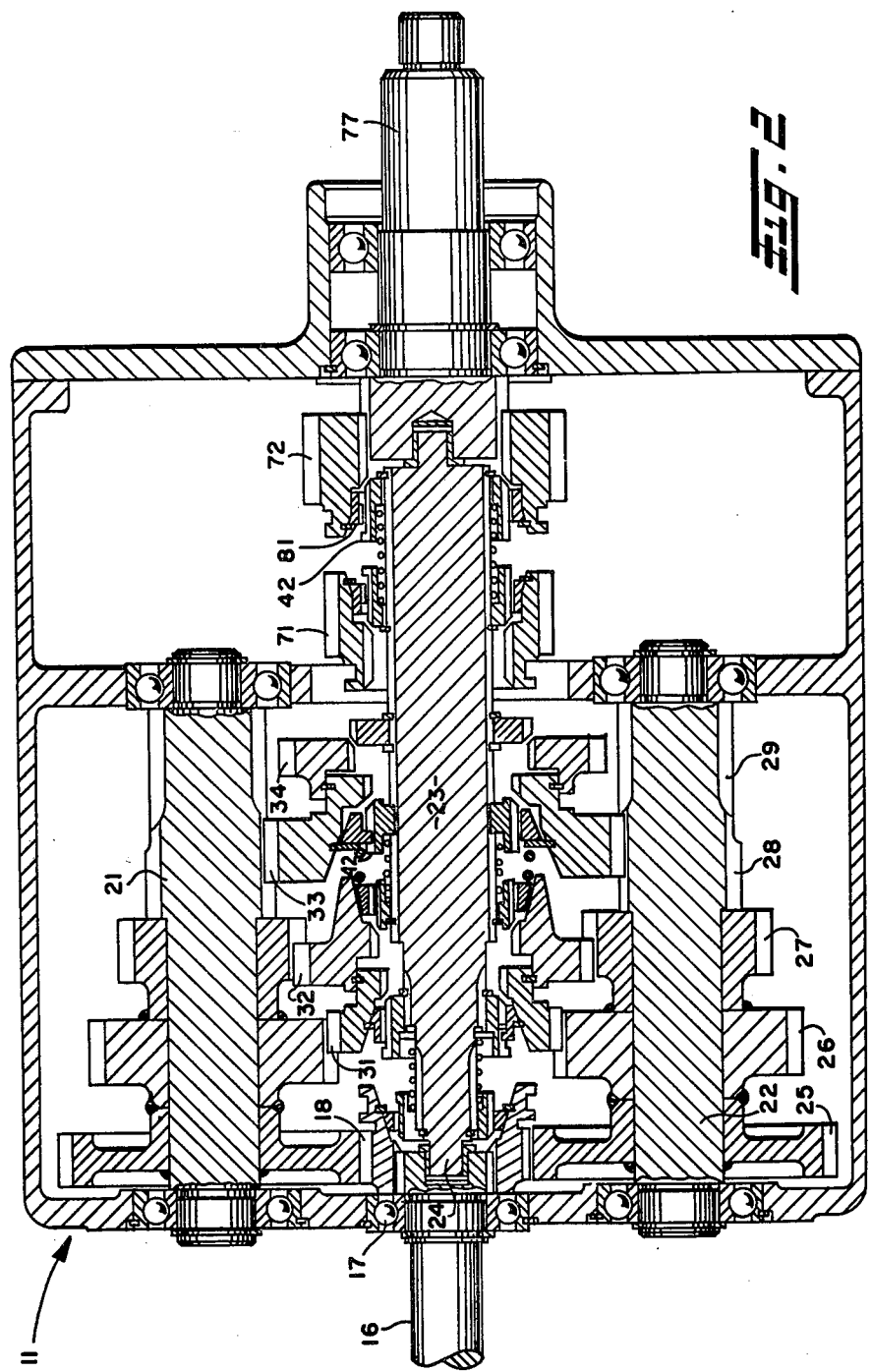
FIG. 2 is a cross-sectional view of said transmission taken substantially along the line II—II of FIG. 3.

Certain terminology will be used in the following description for convenience in reference only and will not be limiting. The words "upwardly", "downwardly", "rightwardly", and "leftwardly" will designate directions in the drawings to which reference is made. The words "forward" and "rearward" will refer respectively to the front and rear ends of the transmission as same is conventionally mounted in the vehicle, being respectively the left and right sides of the transmission as illustrated in FIG. 1. The words "inwardly" and "outwardly" will refer to directions toward and away from, respectively, the geometric center of the device and designated part thereof. Said terminology will include the words above specifically mentioned, derivatives thereof, and words of similar import.

The term "simple transmission" is used to designate a change speed transmission wherein the operator may select one of a plurality of single gear reductions. The term "compound transmission" is used to designate a transmission having a main transmission portion and an auxiliary transmission portion whereby the selected gear reduction in the main transmission portion may be compounded by further selected gear reduction in the auxiliary transmission portion. The term "splitter type compound transmission" as used herein will designate a compound transmission wherein the auxiliary transmission is used to provide various selectable steps of the gear ratio selected in the main transmission portion. The term "upshift" as used herein shall mean the shifting from a lower speed gear ratio to a higher speed gear ratio. The term "downshift" as used herein shall mean the shifting from a higher speed gear ratio to a lower speed gear ratio. The terms "low speed gear", "low gear" and/or "first gear" as used herein shall all designate the gear ratio utilized for lowest forward speed operation in a transmission, i.e., that set of gears having the highest ratio of reduction relative to the input shaft of the transmission.

The term "blocked transmission" shall designate a change gear transmission wherein a selected gear is nonrotatably coupled to a shaft by means of a positive clutch and a blocker is utilized to prevent such engagement until the members of the positive clutch are at synchronous, such synchronous condition achieved by manual and/or automatic manipulation of the transmission input and/or output shafts to cause the clutch members associated with said shafts to cross synchronous but not achieved by frictional contact of the selected clutch members sufficient to cause one of the clutch members, and the apparatus associated therewith, to rotate with the other clutch member.

The term "synchronized transmission" shall designate a change gear transmission wherein a selected gear is nonrotatably coupled to a shaft by means of a positive clutch, attempted engagement of said clutch is prevented until the members of the clutch are at synchronous and frictional means associated with clutch members are sufficient, upon initiation of a clutch engagement, to cause the clutch members, and all members rotating therewith, to rotate at a substantially synchronous speed of rotation.

The improved blocked transmission of the present invention is illustrated in connection with a resiliently shiftable change speed transmission of the type having a floating main shaft and a plurality of substantially identical countershafts as may be seen in more detail by reference to the above mentioned U.S. Pat. Nos. 3,799,002 and 3,924,484. Although the improved transmission and improved jaw clutch-blocker assembly of the present invention is illustrated in connection with such a resiliently shiftable change speed transmission, it is understood that the improved transmission of the present invention may utilize any type of axially engageable positive clutch.

Both the prior art blocker-jaw clutch assemblies and the improved blocker-jaw clutch assembly of the present invention contain advantageous features in that, for the blocking function thereof, there is required removal of only one portion of one first tooth of a clutch member and the blocker ring is provided with a first pair or set of projections extending toward the clutch element from which a part of said one first tooth has been removed. Said first projections are of sufficient circumferential spacing to straddle the remaining portion of said one first tooth, hereinafter called a "partially removed tooth", when synchronization is achieved for effecting an unblocking condition, and said projections are sized to engage other teeth on said clutch member whereby said blocker will rotate with said clutch member with a limited degree of rotational freedom therebetween for permitting circumferential shifting thereof in at least one direction and the creation of a blocking condition. In the preferred embodiment, three first arrays of partially removed teeth and projections are utilized. The preferred embodiment of the improved blocker and jaw clutch assemblies of the present invention, in addition to the above mentioned first arrays, utilizes a second and third tooth, one on each circumferential side of the first partially removed tooth, having a portion thereof removed, and a pair of ramps associated with the first set of projections, each inclined in an opposite direction. The remaining portions of said second and third partially removed teeth are on the opposite axial end of said clutch member from the remaining portion of said first partially removed tooth. The circumferential space between the greater circumferentially spaced one of the ramps or the second and third partially removed teeth is of a lesser circumferential extension than the circumferential extension of the other of the ramps or the second and third partially removed teeth whereby said ramps and said second and third partially removed teeth will interfere to positively limit axial movement of the blocker relative to said clutch member in one axial direction. Contact of said ramps with said second and third partially removed teeth under an axial biasing force effective to cause rotation of said blocker relative to said clutch member sufficient to align said first partially removed tooth with the spacing between said first set of projections. Biasing means are provided for biasing said blocker towards said other clutch member thus biasing said ramps into contact with the second and third partially removed teeth.

Insofar as concerns the integration of the improved blocker and jaw clutch assembly of the present invention, and the blocker and jaw clutch assemblies of the prior art, into the entire shiftable change speed transmission system, the blockers are placed between the two relatively axially slidable portions, or members, of at least one and preferably most or all of the transmission positive clutches and the usual friction means are provided for causing the blockers to tend to rotate with one of said members as the clutch members respectively move toward each other during a clutching procedure. One of said clutch members is often formed integrally with a main shaft gear as internal clutch teeth thereof. As the clutching procedure occurs, the blocker limits such relative axial movement until substantial synchronization between the clutch members involved in a given shift is sensed.

Referring now to the drawings, there is illustrated a resiliently shiftable, change speed blocked transmission 11 having both a main transmission section 12 and an auxiliary transmission 13, each of which have a plurality of selectable ratios. The transmission illustrated is generally referred to in the art as a compound transmission and is of the splitter type of compound transmission. The main and auxiliary sections are both suitably enclosed by conventional housing means.

The blocked transmission 11 includes an input shaft 16 supported adjacent its rearward end by a bearing 17 and is provided with an input gear 18, nonrotatably connected thereto, as by splines. The input gear 18 simultaneously drives a plurality of countershafts at equal rotational speeds. In the illustrated embodiment, the transmission is provided with two countershafts, 21 and 22, disposed on diametrically opposite sides of the main shaft 23, which main shaft is coaxially aligned with the input shaft 16 and is provided with a pilot portion 24 on its forward end rotatably received within and supported by the rearward end of the input shaft 16.

The input shaft 16 is normally driven in one direction only by a prime mover, such as a Diesel engine E through a selectively operated, normally engaged, friction master clutch C. Clutch C may be disengaged by use of pedal P as is known in the prior art. The pedal P, when fully depressed, is effective to engage a normally disengaged input shaft brake B as is also well known in the prior art. Input shaft brake B may be replaced by any other type of normally disengaged input brake.

Each of the countershafts 21 and 22 is provided with an identical grouping of countershaft gears, 25, 26, 27, 28 and 29 thereon, which groupings form pairs of gears, such as the pair of gears 26, of identical size and number of teeth and disposed on diametrically opposite sides of main shaft 23.

A plurality of main shaft drive gears 31, 32, 33 and 34 encircle the main shaft and are selectively clutchable thereto one at a time by yieldable clutch mechanisms, as described in greater detail hereinafter and in the above incorporated patents.

The main shaft gears 31, 32 and 33, encircle the main shaft 23, are in continuous meshing engagement with, and are floatingly supported by the diametrically opposite pairs of countershaft gears 26, 27 and 28, respectively, which mounting means and the special advantages resulting therefrom are explained in greater detail in U.S. Pat. Nos. 3,105,395 and 3,335,616, both assigned to the assignee of this application and hereby incorporated by reference. The main shaft gear 34 is the reverse gear and is in continuous meshing engagement with a pair of countershaft gears 29 by means of conventional intermediate or idler gears (not shown). The forwardmost countershaft gears 25 are continually meshed with and driven by the input gear 18 for causing simultaneous rotation of the countershafts 21 and 22 whenever the input shaft is rotatably driven. As illustrated in FIG. 1, the input gear 18 is connected to a conventional shift fork 39, which shift fork is controlled by the shift rod 37 for permitting input gear 18 to be shifted axially for selectively permitting direct driving engagement between the input shaft 16 and the main shaft gear 23.

The main shaft gears 31 and 32 are axially interconnected to form a gear pair and are connected to a conventional shift fork 36. The position of the shift fork 36 being controlled in a conventional manner by means of appropriate shift rods similar to rod 37. The main shaft gear pair 31-32 is thus shiftable axially relative to main shaft 23 in response to axial shifting of the fork 36 by said rod. However, the gears 31 and 32 are independently rotatable relative to one another. The improved blocker and jaw clutch assembly, 100, is utilized in connection with gear 31 and is described in greater detail below. In a similar manner, the main shaft gears 33 and 34 are also axially interconnected so as to be axially shiftable as a pair by means of the shift fork 38, which shift fork is also controlled by appropriate shift means. The main shaft gear pair 33-34 is likewise and similarly axially movable relative to the main shaft 23 and independently rotatable.

Figure 3:
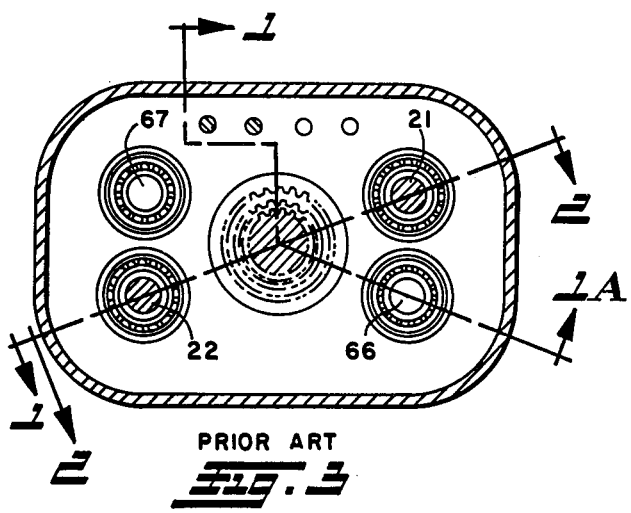
FIG. 3 is a sectional elevational view taken along the line III—III of FIG. 1.

Considering now the splitter auxiliary section 13, the main shaft 23 extends thereinto and is coaxially arranged with and piloted into an output shaft 58 which is in turn supported within the housing 13 by suitable bearings generally indicated at 59. Said auxiliary section further includes a plurality of countershafts 66 and 67 (FIG. 3) each having an identical grouping of countershaft gears thereon, of which two appear at 68 and 69 (FIG. 1). The first pair of countershaft gears 68 are disposed diametrically opposite and in continuous meshing engagement with the main shaft gear 71, which main shaft gear is floatingly supported by the forward pair of countershaft gears, one being the gear 68 for substantially consecutively encircling the main shaft 23. A further main shaft gear 72 is also floatingly and substantially consecutively encircling the main shaft 23. A further main shaft gear 72 is also floatingly and substantially consecutively supported relative to the main shaft 23 by the rearward pair of countershaft gears, one being the gear 69. Shift forks 73 and 74, respectively, are provided for effecting the shifting of gears 71 and 72 and said shift forks are operable by appropriate shift rods of which one appears at 76 for operation by any desired means such as the pressure cylinder 77. Appropriate control means 78, a presently known type, is provided for properly effecting and interrelating control of the shift means for the forward gears 18 and 31-34 and the splitter gears 71 and 72.

The yieldable clutch structures are arranged between the shiftable main shaft gears in both the main transmission and the auxiliary section and are provided with resilient means for urging engagement thereof as set forth in detail in the above mentioned U.S. Pat. Nos. 3,799,002 and 3,983,979. While clutch means utilizing relatively nondeformable blockers of the prior art are not identical with each other, they are generally similar and hence insofar as the present invention is concerned, it will be sufficient to describe only one of them in detail with the understanding that same may be applied to the other clutch units without difficulty by anyone skilled in the art. Therefore, for this purpose, referring to the positive jaw clutch unit positioned between the main shaft gear 72 and the main shaft 23 in the auxiliary transmission section, said jaw clutch unit is generally designated 41 and includes an annular clutch collar or clutch member 42 encircling the main shaft 23. The clutch collar 42 is provided with internal splines 43 which are disposed within corresponding external splines 44 provided on the main shaft 23 for interconnecting the clutch collar 42 to the main shaft 23 for rotation therebetween. However, the cooperating splines 43 and 44 permit the clutch collar 42 to freely slide axially relative to the shaft 23. A stop ring 46 is seated within a suitable groove formed on the external periphery of the shaft 23 and is disposed for contacting the clutch collar 42 and limiting the leftward axial movement thereof. The collar 42 is normally resiliently urged by means of a spring 47 into a butting engagement with the stop ring 46.

The clutch collar 42 is provided with external teeth 48 thereon which are adapted to meshingly engage the internal teeth 50 provided on one of the main shaft gears, such as gear 72, the internal teeth 50 forming the other member of clutch 41. The teeth 48 on the clutch collar 42 are tapered, as at 51, and in a similar manner the leading edge of the teeth 50 on the main shaft gear 72 are similarly tapered at 52. The tapered conical surfaces 51 and 52 each extend at an angle of preferably between 30° and 40° relative to the longitudinal axis of the main shaft 23. The exact degree of taper, and the advantages thereof, are explained in detail in U.S. Pat. No. 3,265,173. The other end of the spring 47 resiliently acts against a further clutch collar 53 (FIG. 1) which collar is identical to the collar 42 but is disposed so that it has the tapered leading ends of teeth facing in the opposite direction.

Further resilient, substantially identical, clutch assemblies are provided for the other shiftable gear sets but same are set forth in detail in the above incorporated patents and hence further description thereof is unnecessary here.

Figure 4:
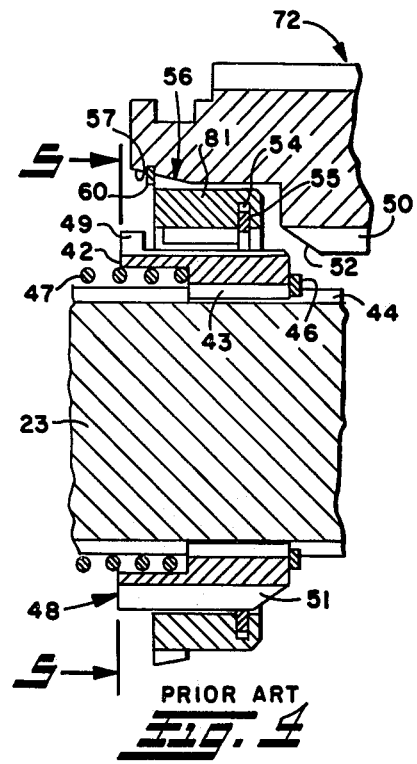
FIG. 4 is an enlarged fragmentary view of the jaw clutch structure utilized in connection with prior art blockers.
Figure 5:
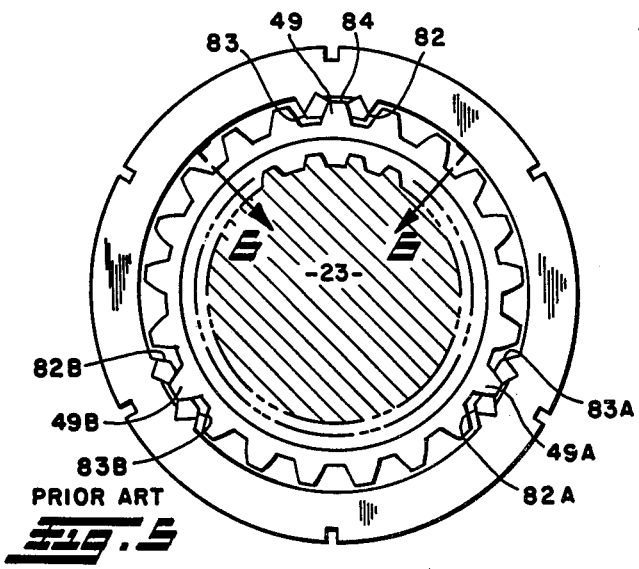
FIG. 5 is a sectional view of a prior art jaw clutch and blocker structure.
Figure 6:
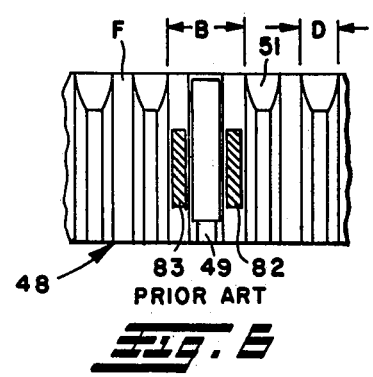
FIG. 6 shows the components of the prior art blocker fragmentarily in synchronous condition permitting shifting.
Figure 7:
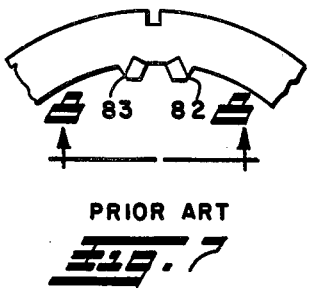
FIG. 7 is an enlarged fragmentary detail of the prior art blocker ring teeth taken from the same direction as shown in FIG. 5.
Figure 8:
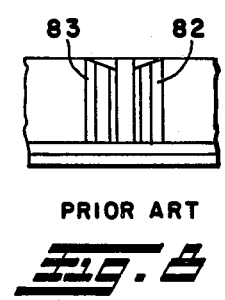
FIG. 8 is a view taken in the direction of the arrows VIII—VIII in FIG. 7.

Referring to FIG. 4, a portion of each of a selected number, here three, of the teeth 48 are partially removed for permitting the presence of a blocking ring as hereinafter further described. Such partial removal leaves, however, an axially shortened, or partially removed, tooth 49 for cooperation with the blocking ring.

Referring now to the relatively nondeformable prior art blockers, which are illustrated in FIGS. 5 through 8, one thereof is indicated generally at 81, and comprises a ring encircling the clutch member 42 and has an appropriate number, here three pairs, or radially inward projections 82 and 83, which when properly positioned will mate with the external teeth above mentioned. The inward projections of blocker teeth 82 and 83 are contoured at their sides to lie snugly against the adjacent ones of the teeth 48 and are positioned to project into the spaces between a partially removed tooth 49 and the teeth 48 on each side thereof. Blocker ring 81 is thus splined to clutch member 42 for rotation therewith. Each pair of projections 82 and 83 are circumferentially of less dimension than the corresponding circumferential spaces defined by the teeth immediately adjacent the partially removed teeth 49 and thus blocker ring 81 may be rotated in either a limited clockwise or counterclockwise direction relative to clutch member 42 from the position seen in FIG. 5 in which the space between teeth 82 and 83 aligns with partially removed tooth 49. Contact of either projection 82 or 83 by a clutch tooth 48 will limit such relative rotation and cause blocker 81 to rotate with clutch member 42. The space between the inwardly projecting teeth 82 and 83 is of a clearance distance wider than the corresponding circumferential dimension of the tooth 49 so that when properly aligned at synchronism (or more accurately, when the relative speeds of the clutch components cross synchronism) the teeth 82 and 83 will straddle the tooth 49 and the clutch member 42 can move axially through but not past blocker ring 81 to effect engagement with its corresponding clutch member integrally formed in a corresponding gear. As may be seen by reference to FIG. 8, the end faces of the projections 82 and 83 may be tapered.

As is described in greater detail by reference to U.S. Pat. Nos. 3,921,469 and 3,924,484, the radially inner side of ring 81 may be provided with an inwardly directed groove 54 which receives an annular resilient ring 55 which is normally of slightly less internal diameter than the external diameter of the teeth 48 so that when the parts are in the assembled condition, ring 55 is distorted slightly outwardly thereby to exert a light but definite pressure against the external surface of said teeth 48. Inasmuch as the ring 55 fits loosely and only in light frictional contact with the walls of the groove 54, this effects a significant resistance to axial movement between the blocker ring 81 and the clutch ring 42 but only an insignificant resistance to relative rotative movement therebetween.

A suitable conical surface 56 projects radially outwardly from the blocker ring 81 and is positioned for engagement with a similar conical surface 57 on a radially inner wall of the gear 72. The axial drive above mentioned is sufficient that the rotative driving effect of the surface 57 onto the blocker 81 is much greater than whatever rotative resistance may exist between the blocker 81 and the clutch member 42. A stop ring 60 limits movement of the blocker 81 away from the conical surface 57 when the clutch ring 42 moves out of engagement (leftwardly in FIG. 4). Blocker ring 81 will, with a certain amount of axial freedom, move axially with gear 72 and clutch member 50 integral with gear 72 as a result of contact with either surface 57 or ring 60.

The other two partially removed teeth corresponding to tooth 49 are indicated at 49A and 49B and internally extending projections on the blocker ring corresponding to the projections 82 and 83 are indicated at 82A and 83A for cooperation with the partial tooth 49A and at 82B and 83B for cooperation with the partial tooth 49B.

The operation of the blocker 41 is generally similar to that of known generally nondeformable blockers, and, in particular is substantially identical to those nondeformable blockers described in U.S. Pat. No. 3,924,484. For example, assuming the gear 72 is rotating more rapidly than the clutch member 42, which, of course, rotates at the same speed as the main shaft 23, the blocker 81 will normally (ignoring for the moment the effect of the ring 55) tend to rotate with the gear 72, hence, lead the clutch member 42 and position the teeth 83, 83A, and 83B, in a position to interfere with the partial teeth 49, 49A, and 49B, respectively, to prevent axial clutching movement of the clutch component to the right. However, as the shaft 23 accelerates and a condition of synchronism is approached, the space between the inwardly projecting blocker teeth will become substantially centered with the partial teeth on the periphery of the clutch member 42 and upon reversal of the relative speeds, the blockers will no longer block and the clutch member 42 will move into clutching engagement in the usual manner.

With the gear 72 initially running slower than the shaft 23, the operation will be generally similar to that described above excepting that the blocker 81 will lag behind the clutch member 42 until there occurs a reversal of relative speeds, i.e., a passing through synchronous, at which time blocking will cease and clutching will again be completed in a manner already well known for blocking devices.

Considering now the effect of the compression or drag ring 55, it will be recognized that when there is no appreciable axial pressure rightwardly, as appearing in FIG. 4, on the blocker ring 81, there will be no appreciable friction between the conical surfaces 56 and 57 and hence no tendency for the blocker ring 81 to rotate with the gear 72. However, as the clutch member 42 commences to move axially rightwardly, the axial drag provided by the drag ring 55 urges the blocking ring 81 likewise axially to effect interengagement between the friction surfaces 56 and 57. Since the rotative driving force of the surface 57 onto the blocker ring is greater than the rotative resistance between the blocker ring and the clutch ring, the blocking ring 81 commences rotating with the gear 72 and does so prior to contact between the teeth of the blocker 81 and teeth of the clutch member 42.

Blocked transmissions, such as transmission 11 described above, utilizing substantially nondeformable blockers which are operable to block or permit a jaw clutch engagement dependent upon the rotative position of the blocker relative to one of the jaw clutch members are a considerable improvement over prior art devices. However, such blocked transmissions have inherently required auxiliary mechanism and/or operational procedures to achieve satisfactory gear engagement when the transmission is to be shifted from neutral into a drive gear when the vehicle driven by the transmission is at rest.

As a blocked transmission is placed in neutral with the driven vehicle stopped, motion of the gearing and random frictional contact between the gearing and the blockers will usually tend to place the blockers in the upshifting position. Thus, for example, if the gear 32 and main shaft 23 are rotating in a counterclockwise direction as seen in FIG. 10, the blocker ring associated with gear 32 would be rotated counterclockwise relative to the clutch member on which it is carried. To achieve a crossing of synchronous, the gear 32, which the blocker ring will tend to rotate with, must be caused to rotate clockwise relative to the main shaft 23. Such a relative rotation will occur only if the main shaft is rotated faster than the gearing or if the input shaft and gearing is rotated in the reverse (clockwise) direction. Since, at neutral, it is difficult or impossible to rotate a simple transmission output shaft or a compound splitter transmission mainshaft faster than the input shaft and gearing, a means for selectively and/or automatically positively reverse rotating the input shaft 16 and gearing driven thereby or a means to bring the blocker and associated jaw clutch member into alignment is required. The improved blocker and jaw clutch assembly of the present invention is provided to selectively align the blocker and jaw clutches when the transmission is in neutral with the driven device at rest.

The improved blocker and jaw clutch assembly 100 of the present invention is illustrated in detail in FIGS. 9–12 and the structure and operation thereof is schematically illustrated in FIGS. 13–16.

The improved blocker and jaw clutch assembly 100 is illustrated as utilized with the main transmission section second speed main shaft ratio gear 32 for selectively engaging gear 32 to the main shaft 23. As has been indicated above, gears 31 and 32 are an axially interconnected pair of gears which will move together axially to the left for engagement of gear 31 and axially to the right for engagement of gear 32. Gears 31 and 32 are axially interconnected by stop ring 103 or the like.

Referring to FIGS. 9–12, a yieldable positive clutch unit, namely that positioned between the second speed main transmission section main shaft gear 32 and the main shaft 23 is illustrated. The cluth unit comprises a first annular jaw clutch member or collar, 104, encircling the main shaft 23. The first clutch member 104 is provided with internal splines 106 which are disposed within external splines 108 provided on the main shaft for rotationally interconnecting the first clutch member 104 to the main shaft. Cooperating splines 106 and 108 allow the first clutch member 104 to freely slide axially relative to the mainshaft. A stop ring 110 is seated within a groove formed on the exterior periphery of main shaft 23 for contacting first clutch member 104 and limiting the leftward axial movement thereof. The first clutch member 104 is resiliently urged by spring 112 to the left into butting engagement with the stop ring 110.

The first clutch member 104 is provided with external clutch teeth 114 which are adapted to meshingly engage the internal clutch teeth 116 provided on the gear 32. Teeth 116 on the gear 32 comprise the second clutch member of the jaw clutch for engaging gear 32 to shaft 23. Clutch teeth 114 and 116 may be tapered as at 118 and 120 respectively as is well known in the prior art.

The blocker 122 of the improved blocker-jaw clutch assembly 100 is a generally nondeformable ring encircling the first clutch member 104 and has an appropriate number, here three pairs, of radially inwardly extending spaced projections or teeth, 124 and 126. The first clutch member 104 includes a first clutch tooth 128 having a portion thereof, that portion axially closest clutch teeth 116, removed, and a second and third clutch tooth, 130 and 132, on either side of partially removed tooth 116, each having a portion thereof, that portion most axially distant clutch teeth 116, removed.

The inwardly extending projections, 124 and 126, each include a ramp 134 and 136, respectively, on the axial end thereof closest clutch teeth 116 (to the left in FIG. 9). The ramps 134 and 136 extend in opposite directions.

The circumferential spacing 140 between the most distant points on ramps 134 and 136 is greater than the circumferential spacing 142 between the most distant edges of the second and third partially removed teeth 130 and 132, and the circumferential spacing 144 between projections 124 and 126 is greater than the circumferential width 146 of the first partially removed tooth 128. The axial length 148 of projections 124 and 126 is greater than the axial distance 150, between first partially removed tooth 128 and either the second and third partially removed teeth 130 and 132.

The ramps 134 and 136 will engage the second and third partially removed teeth 130 and 132 to positively limit axial movement of the blocker 122 towards clutch teeth 116 (to the left in FIG. 9) relative to first clutch member 104 and will, when biased into contact with partially removed teeth 130 and 132, tend to rotate the blocker 122 relative to clutch member 104 to align the space between projections 124 and 126 with the first partially removed tooth 128.

A suitable conical surface 152 projects radially outwardly from the blocker ring 122 and is positioned for engagement with a similar conical surface 154 on a radially inner wall of gear 32. A stop ring 156 limits movement of the blocker 122 away from the conical surface 154 when the first clutch member 104 moves out of engagement (rightwardly in FIG. 9). Blocker ring 122 will, with a small amount of axial freedom, move axially with gear 32. Sufficient axial clearance between ring 156 and blocker 122 must be provided to allow the leftward movement of gear pair 31 and 32 for selective engagement of gear 31. The axial position of first clutch member 104 relative to gear 32, when engagement of gear 32 is not attempted by an axially rightward movement of gear 32, assures that the interaction of the ramps 134 and 136 with the second and third partially removed teeth 130 and 132, will maintain a separation of conical clutch surfaces 152 and 154. This is important as a compression spring 158 is utilized to bias the ramps into contact with the second and third partially removed teeth (leftwardly in FIG. 9) and thus the conical surface 152 towards conical surface 154. If such a clearance or separation were not maintained, undesirable wear of the conical clutch surfaces might occur.

When the ramps 134 and 136 are biased into contact with the second and third partially removed teeth 130 and 132, the blocker 122 will rotate with the first clutch member 104. As gear 32 is moved toward the first clutch member 104 (rightwardly in FIG. 9), the conical clutch surfaces 152 and 154 will establish contact and the blocker 122 will move axially with the gear 32 against the bias of spring 158. In this position, the ramps 134 and 136 will be pulled off of the second and third partially removed teeth 130 and 132, and a limited degree of relative rotational freedom between blocker 122 and first clutch member 104 is permitted. The blocker 122, within the limits of rotational freedom permitted by clearance between the ramps 134 and 136 and the second and third partially removed teeth 130 and 132, will tend to rotate with the gear 32 as a result of the interaction of the engaged conical clutch surfaces 152 and 154. As the axial length 148 of the projections 124 and 126 is greater than the axial separation 150 between the first partially removed tooth 128 and either of the second or third partially removed teeth 130 and 132, the rotational freedom between the blocker 122 and first clutch member 104 is limited to the circumferential clearance between the ramps 134 and 136 and the second and third partially removed teeth 130 and 132 at a given axial position of the blocker 122 relative to the first clutch member 104.

The ramps 134 and 136, and the second and third partially removed teeth 130 and 132, define a spline-like connection between the blocker 122 and the first clutch member 104 permitting relative axial movement therebetween in at least one axial direction and whereby the blocker ring 122 is rotationally carried by the clutch member 104 with a limited, predetermined degree of relative rotation therebetween, depending upon the axial position of blocker ring 122 and first clutch member 104.

The projections 124 and 126 will interact with the partially removed tooth 128 in substantially the same manner as the previously described projections 82 and 83 interact with partially removed teeth 49 so that when properly aligned at synchronism (or, more accurately, when the clutch components cross synchronism) the projections 124 and 126 will straddle the partially removed tooth 128 and the first clutch member 104 can move axially through but not past the blocker ring 122 to effect engagement with second clutch member 116 formed integrally with gear 32.

The relative rotational freedom permitted between blocker 122 and clutch member 104 is sufficient to allow both alignment and misalignment of partially removed tooth 128 with the space between projections 124 and 126.

The other two first partially removed teeth corresponding to the removed tooth 128 are indicated at 128A and 128B and radially inwardly extending projections on the blocker ring 122 corresponding to the projections 124 and 126 are indicated at 124A and 126A for cooperation with the partial teeth 128A and at 124B and 126B for cooperation with the partial tooth 128B. The other two second and third partially removed teeth are indicated at 130A and 130B and at 132A and 132B, respectively.

The blocking operation of the improved blocker and jaw clutch assembly 100 is substantially identical to that described above in connection to the blocker 81. The improved blocker and jaw clutch assembly 100, in addition to providing the blocking function, also provides the additional function of automatically aligning the space between projections 124 and 126 with the first partially removed tooth 128 when the transmission is in neutral. When the transmission is in neutral, and at times when engagement of gears 32 or 31 is not selected, the action of spring 158 biasing the sharply inclined ramps 134 and 136 into contact with the second and third partially removed teeth 130 and 132, will cause rotation of the blocker 122 relative to the first clutch member 104 sufficient to position the first partially removed tooth 128 into alignment with the space between the projections 124 and 126.

In operation, assuming the blocked transmission 11 of the present invention is in neutral with the driven device at rest (and the prior art blockers in the normally assumed "upshift position"), if the operator wishes to engage the main transmission section second speed gear, gear 32, the operator would, with the input shaft brake engaged, simply shift toward the desired gear 32. As the spring 158 has biased the ramps 134 and 136 into contact with the second and third partially removed teeth 130 and 132, the first partially removed tooth 128 will be aligned with the space between the projections 124 and 126. The input shaft brake B will help to retain the above alignment as the gear 32 is moved to the right to cause the first clutch member, under the bias of spring 112, to pass through the blocker and into engagement with the second clutch member.

The alignment, or automatic self-alignment, function of the improved blocker-jaw clutch assemblies of the present invention may be seen by reference to FIGS. 13-16.

In FIGS. 13-16, an improved blocker-jaw clutch assembly 200 is schematically illustrated in a flattened embodiment. The assembly 200 includes a first clutch member 204 which, for illustrative purposes, is shown as fixed, a gear G and a blocker or blocker ring, 222. The gear G and the blocker 222 are movable in the right-left direction (corresponding schematically to axial movement relative to main shaft 23) and the up-down direction (corresponding schematically to relative rotation of the gear G and blocker 122 relative to clutch member 104. The clutch member 204 includes clutch teeth 214 which, upon sufficient leftward movement of the first clutch member 204, will engage clutch teeth 216 on a second clutch member, formed integrally with gear G. Blocker 222 includes a conical clutch surface 252 for engagement with conical clutch surface 254 on gear G. A compression spring 258 biases blocker 222 leftwardly and another compression spring 212 biases first clutch member 204 leftwardly. A means (not shown) positively limits leftward axial movement of the first clutch member 204.

Blocker ring 222 includes a pair of projections, 224 and 226, having sharply inclined ramps 234 and 236 thereon. The first clutch member 204 has a first partially removed tooth 228 and a second and third partially removed tooth 230 and 232 respectively. The remaining portion of the first partially removed tooth 228 is between the remaining portions of the second and third partially removed teeth and on the opposite axial end of first clutch member 204 as the remaining portions of second and third partially removed teeth 230 and 232. The distance 240 between greatly spaced points on ramps 234 and 236 is greater than the distance 242 between the most greatly spaced surfaces on the second and third partially removed teeth. Leftward movement of blocker 222 relative to first clutch member 204 is thus positively limited. The projections 224 and 226 are separated by a distance 244 greater than the width 246 of the first partially removed tooth 228. The length 248 of projections 224 or 226 is equal to or greater than the axial spacing 250 between the remaining portions of partially removed tooth 228 and either of partially removed teeth 230 or 232.

FIG. 13 is an exploded view of the schematic representation of blocker-jaw clutch assembly 200.

Figure 14:
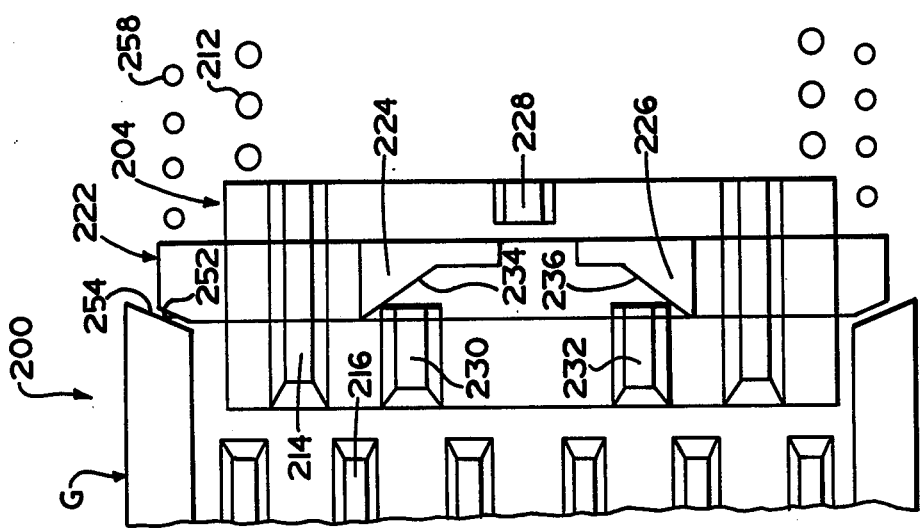

FIG. 14 illustrates the position of assembly 200 when the transmission is in a static condition. Spring 212 urges first clutch member 204 toward clutch teeth 216 (to the left) against a positive step. Spring 258 urges blocker 222 to the left causing the ramps 234 and 236 to contact the second and third partially removed teeth 230 and 232, which causes the blocker 222 to be positioned so that the space between the projections 224 and 226 is aligned with the first partially removed tooth 228 and limiting leftward axial movement of blocker 222 relative to gear G whereby, at neutral, a clearance is maintained between conical clutch surfaces 252 and 254.

Should a shift be attempted at static conditions, with an input brake utilized to maintain the position of gear G, rightward movement of gear G would result in the teeth 214 on the first clutch member engaging teeth 216 on the gear G as partially removed tooth 228 will align with the space between projections 224 and 226 and pass therebetween.

Figure 15:
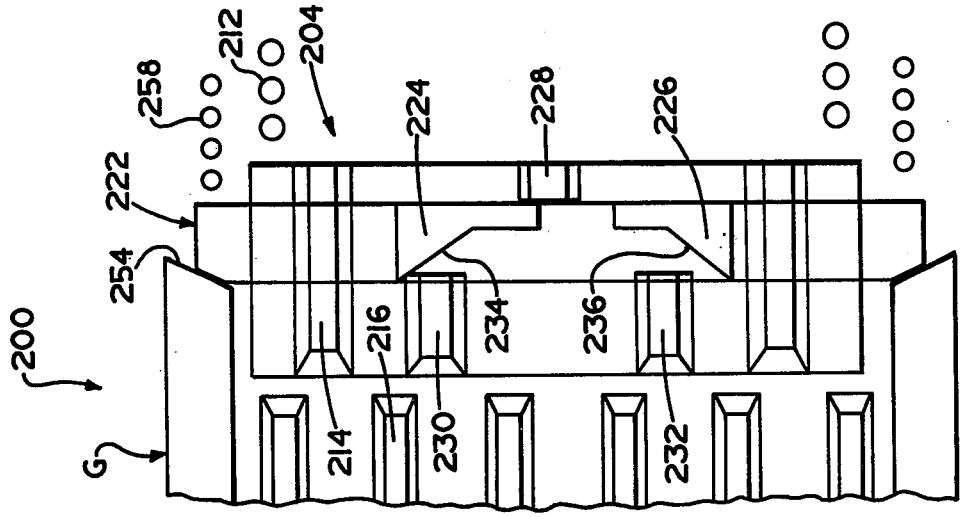

FIG. 15 illustrates a relative position of blocker 222 and clutch member 204 wherein leftward movement of clutch member 204 is prevented, or blocked, by the contact of first partially removed tooth 228 with projection 224. This generally corresponds to a blocked clutch engagement of a blocked transmission such as transmission 11.

Figure 16:
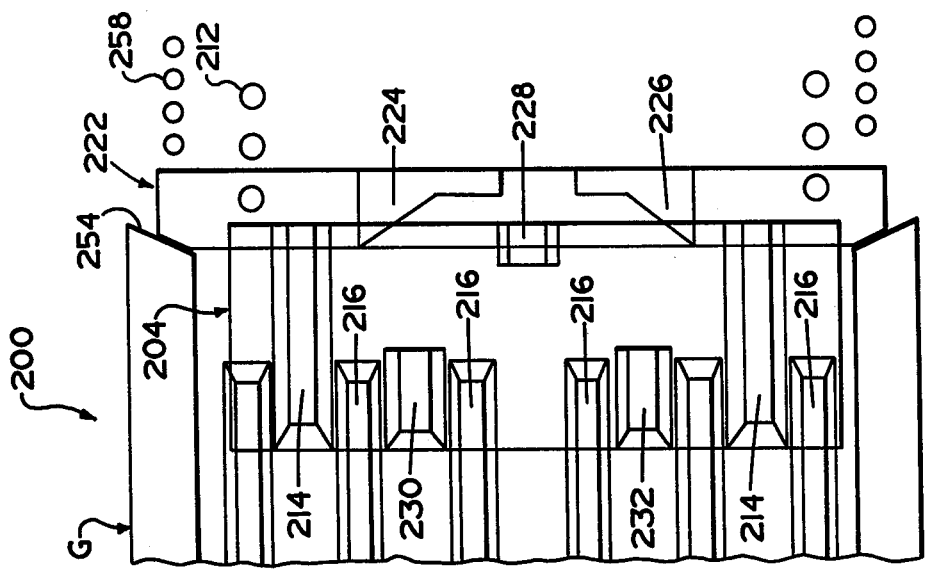

Briefly, as an engagement of gear G is attempted, gear G is moved toward first jaw clutch member 204 (to the right in FIG. 15). Conical clutch surface 254 on gear G will contact clutch surface 252 on blocker 222, causing the blocker to move axially with the gear G and pulling the ramps 234 and 236 away from the second and third partially removed teeth. This allows blocker 204 a certain degree of rotational (up-down in FIGS. 13-16) freedom relative to first clutch member 204, and the blocker will move with the gear. If the gear G is not synchronous with first clutch member 204, the blocker 204 will move up or down sufficiently to cause first partially removed tooth 228 to become not aligned with the space between the projections 224 and 226. As the relative movement of the first clutch member 204 into engagement with teeth 216 on gear G is blocked, the clutch member 204 will move to the left with the gear G further compressing spring 212. As the gear G and first clutch member 204 cross synchronous, the first partially removed tooth 228 will momentarily align with the space between projections 224 and 226, and compressed spring 212 will cause the clutch member 204 to move quickly to the left, or snap into engagement with the clutch teeth 216. The engagement of teeth 214 on the first clutch member 204 with teeth 216 on gear G is shown in FIG. 16.

While the specific embodiment of the invention has been set forth herein for illustrative purposes, it is understood that the present disclosure of the preferred form has been made only by way of example and that numerous changes and the details of construction and combination and arrangement of the parts may be resorted to without departing from the spirit and the scope of the invention as hereinafter claimed.

We claim:

1. An improved blocker and jaw clutch assembly of the type comprising a substantially non-deformable blocker ring carried by a first of two axially engageable positive clutch members for rotation therewith with a predetermined relative rotation therebetween, said blocker ring axially movable relative to said first clutch member in at least one axial direction, said blocker ring operable to tend to rotate with said second clutch member at initiation of a clutch engaging operation, said blocker ring and first clutch member each having first projections extending therefrom defining a first array of interacting projections, said first array of interacting projections effective to block relative axial movement of said first clutch member toward said second clutch member if not aligned, said blocker ring having at least one rotational position relative to said first clutch member wherein said first array of projections are aligned and at least one rotational position relative to said first clutch member wherein said first array of projections are not aligned, said blocker ring effective to sense non-synchronous rotation of said clutch members corresponding to blocker ring rotation relative to said first clutch member sufficient to cause a non-alignment of said first array of projections to block axial engagement of said clutch members, the improvement comprising:
   means associated with said blocker ring and said first clutch member effective to automatically cause alignment of said first array of projections, said means comprising:
   a pair of oppositely inclined ramps extending from one of said blocker ring and said first clutch member and at least one second projection extending from the other of said blocker ring and first clutch member, said ramps effective to cause rotation of said blocker ring relative to said first clutch member sufficient to align said first array of projections when axially biased into contact with said second projection, and means biasing said ramps into contact with said second projection.

2. The improved blocker and jaw clutch assembly of claim 1 wherein said first array of projections comprises a first set of adjacent projections extending from one of said blocker ring and first clutch member toward other of said blocker ring and first clutch member and a first tooth extending from the other of said blocker ring and first clutch member toward said one of said blocker ring and first clutch member, said first tooth sized to fit in the space between the projections of said first set of adjacent projections when aligned therewith.

3. The improved blocker and jaw clutch assembly of claim 2 wherein said blocker ring surrounds said first clutch member, said first clutch member comprises a plurality or radially outwardly extending teeth, said first set of adjacent projections extends radially inwardly from said blocker ring toward said first clutch member, said first tooth comprises the remaining portion of a first partially removed tooth extending from said clutch member, said at least one second projection comprises the remaining portions of a second and third partially removed tooth, said remaining portion of said first partially removed tooth circumferentially adjacent and interposed said remaining portions of said second and third partially removed teeth and extending from the opposite axial end of said first clutch member.

4. The improved blocker and jaw clutch assembly of claim 3 wherein said ramps are integral with said first set of adjacent projections.

5. The improved blocker and jaw clutch assembly of claim 4 wherein the circumferential spacing between the one of the remaining portions of the second and third partially removed teeth and said ramps having the lesser circumferential distance between most distant circumferential points is less than the circumferential spacing between the most distant circumferential points of the other of the remaining portions of the second and third partially removed teeth and said ramps whereby relative axial movement of said blocker ring relative to said first clutch member is limited in one axial direction.

6. The assembly of claim 4 wherein said first and second clutch members are resiliently urged together.

7. The assembly of claim 6 wherein said blocker ring is carried by said second clutch member for axial movement therewith with a predetermined amount of axial movement therebetween in at least one axial direction.

8. An improved blocker and clutch assembly of the type comprising a substantially nondeformable blocker ring rotationally carried by a first of two axially engageable positive clutch members, said first clutch member comprising at least one first remaining portion of a partially removed tooth extending generally radially toward said blocker ring and said blocker ring comprising at least one first pair of spaced projections extending generally radially toward said first clutch member, said blocker ring having a predetermined limited degree of rotation relative to said first clutch member and being axially movable relative to said first clutch member in at least one axial direction, said blocker ring tending to rotate with the second clutch member at the initiation of a clutch engaging operation, the space between the projections of said first pair of projections sufficient to permit passage of said remaining portion of said first partially removed tooth when aligned therewith, said blocker ring effective to sense non-synchronous rotation of said clutch members corresponding to blocker ring rotation relative to said first clutch member sufficient to cause said remaining portion of said first partially removed tooth not to align with the space between the projections of the first set of projections to block relative axial engagement of said clutch members, the improvement comprising:
   means effective prior to initiation of a clutch engaging operation to automatically cause said remaining portion of said first partially removed tooth to align with the space between the projections of said first set of projections.

9. The improved assembly of claim 8 wherein said means comprises a pair of ramps extending from said blocker ring, said ramps inclined in opposite directions, and at least one remaining portion of a second partially removed tooth extending from said first clutch member, the remaining portions of the first and second partially removed teeth on opposite axial ends of said first clutch member, said remaining portion of said second partially removed teeth and said ramps effective when axially urged together under pressure to tend to rotate said blocker ring relative to said first clutch member sufficiently to align said remaining portion of said first partially removed tooth with the space between the projections of said first projections and means for biasing said ramps into contact with said remaining portion of said second partially removed tooth.

10. The improved assembly of claim 9 wherein said blocker ring is axially biased towards the axial end of said first clutch member from which said remaining portion of said second partially removed tooth extends, said ramps and said remaining portions of second partially removed teeth effective to limit axial movement of said blocker ring relative to said first clutch member in the axial direction towards the axial end of said first clutch member from which said remaining portion of said second partially removed teeth extends.

11. The improved assembly of claim 10 wherein said at least one remaining portion of said second partially removed tooth comprises a second and a third remaining portion of second and third partially removed teeth, said second and third remaining portions of partially removed teeth adjacent to and on opposite circumferential sides of said first partially removed tooth and said ramps are formed integrally with said first set of projections, said ramps formed on the axial end of said projections opposite the end of said projections designed to engage said remaining portions of first partially removed teeth when said first array of projections is not aligned during the initiation of a clutch engagement operation.

12. The assembly of claim 10 wherein said blocker ring is axially carried by said second clutch member for axial movement therewith in at least one axial direction with a predetermined limited amount of relative axial movement therebetween.

13. The assembly of claim 12 wherein said blocker ring is axially carried by said second clutch member in at least the axial direction towards said first clutch member.

14. The assembly of claim 13 wherein said first clutch member and said blocker ring are biased toward said second clutch member and are both positively limited in axial movement toward said second clutch member.

15. The improved assembly of claim 14 wherein said second clutch member is selectively axially movable toward said first clutch member.

16. The improved assembly of claim 15 wherein said first said clutch member defines a first friction surface engageable with a second friction surface defined on said second clutch member, said friction surfaces axially separated by a biasing force prior to initiation of a clutch engagement operation.

17. The improved assembly of claim 16 wherein movement of said second clutch member axially towards said first clutch member is effective to first cause engagement of said friction surfaces and then to axially move said blocker ring toward the axial end of said first clutch member from which the remaining portion of said first partially removed tooth extends whereby said blocker ring will tend to rotate with said second clutch member.

18. An improved interengageable jaw clutch system of the type comprising a first rotatable means and a first jaw clutch portion mounted thereon for axial sliding relationship therewith and positive rotation therewith, a second rotatable means coaxially related to said first means and a second jaw clutch portion arranged thereon for interengagement with the first jaw clutch portion upon relative axial movement of said jaw clutch portions toward one another, each of said jaw clutch portions having clutch teeth at a radius suitable for engaging with the clutch teeth on the other jaw clutch portion, said one jaw clutch portion having also blocking teeth, said blocking teeth having a leading portion and a trailing portion, said trailing portion extending radially beyond said leading portion, blocker means coacting between said first and second jaw clutch portions for positively preventing engagement of said jaw clutch portions so long as a substantial difference in the relative speed is sensed therebetween, said blocker means including an annular substantially nondeformable blocker ring having at least one pair of blocking portions arranged thereon and supported by said drive teeth for limited rotation with respect thereto and positioned axially between said blocking teeth and said clutch teeth when said jaw clutch portions are disengaged, said pair of blocking portions being provided with a space therebetween capable of receiving therein said blocking teeth trailing portion when said blocking teeth and said spaces are aligned to permit said blocking teeth to move relatively axially past said pair of blocking portions so that said jaw clutch portions can be engaged with one another, and a surface on said blocker ring for frictionally cooperating with the surface on said second jaw clutch portion for causing said blocker ring to tend to rotate with said second jaw clutch portion, the improvement comprising:

means associated with said first clutch portion and said blocker ring effective prior to relative axial movement of said second clutch portion toward said first clutch portion to automatically tend to rotate said blocker ring relative to said first clutch portion sufficiently to align said blocking teeth with the spaces between said blocking portions, said means comprising a pair of ramps extending from blocker ring and said first clutch portion and at least one projection extending from the other of said blocker ring and said first clutch portion, said ramps inclined in opposite directions and the one of said ramps and said projection extending from said first clutch member extending from the opposite axial end of said first clutch member from the trailing portions of said blocking teeth, said ramps and said projection biased into contact.

19. An improved, change gear, blocked transmission having an input shaft rotatably driven by a one-way prime mover through a normally engaged selectively disengageable friction master clutch, input gearing meshingly engaged with the input shaft, output means selectively engageable to said input gearing by jaw clutches comprising first and second axially engageable jaw clutch members, a relatively nondeformable blocker for blocking engagement of at least one of said jaw clutches when the jaw clutch members thereof are at nonsynchronous rotation, said blocker carried by a first jaw clutch member with a limited predetermined degree of relative rotational freedom, said blocker having at least one rotational position relative to said first jaw clutch member wherein said blocker is aligned with said first jaw clutch member and at least one rotational position relative to said first jaw clutch member wherein said blocker is in a position of non-alignment with said first jaw clutch member, said blocker effective to block engagement of said jaw clutch when rotated to a position of non-alignment relative to said first jaw clutch member, the improvement comrising:

means associated with at least one of said blockers effective prior to initiation of a jaw clutch engagement of said jaw clutch members associated with said one of said blockers to automatically cause said blocker to be rotated relative to said first jaw clutch member to a position of alignment relative to said first jaw clutch member.

20. The improved transmission of claim 19 wherein said transmission includes a selectively engageable, normally disengaged, input brake.

21. The improved transmission of claim 20 wherein said means comprises a pair of oppositely inclined ramps extending the axial end of one of said blocker and said first clutch member closest said second clutch member and at least one aligning projection extending from the axial end of said other of said blocker and said first clutch member, said ramps and at least one aligning projection effect when engaged to limit axial movement of said blocker relative to said first clutch member in the direction towards said second clutch member and to tend to rotate said blocker relative to said first clutch member to a position of alignment with said first clutch member and means biasing said blocker toward said second clutch member.

22. The improved transmission of claim 21 wherein said blocker will move axially with said second clutch member, with a predetermined degree of axial freedom when said second clutch member moves axially toward said first clutch member.

23. The transmission of claim 21 wherein said blocker surrounds said first clutch member, said first clutch member comprises a plurality of radially outwardly extending teeth, said blocker and first clutch member defining a first array of projections comprising a first set of adjacent projections extending radially inwardly from said blocker toward said first clutch member and a first partially removed tooth extending radially outwardly from said first clutch member toward said blocker, said first partially removed tooth aligned with the space between the projections of the first set of adjacent projections when said projection is substantially centered between the ramps.

24. The transmission of claim 21 wherein said at least one aligning projection comprises a second and a third partially removed tooth, said second and third partially removed tooth on opposite circumferential sides of said first partially removed teeth, said first partially removed teeth and said second and third partially removed teeth extend from opposite axial ends of said one clutch member and said first set of projections and said ramps extend from opposite axial ends of said blocker.

25. An improved change gear system comprising:

a housing, at least two spaced countershafts having parallel axes and mounted for rotation within said housing, a plurality of groups of gears on said countershafts, each group being comprised of substantially identical countershaft gears on said countershafts, means for supplying one way input power through a normally engaged, selectively disengageable master friction clutch to each of said countershafts, a normally disengaged selective engageable input brake, a driven gear drivable from each group of said countershaft gears, output means for said transmission, means supporting said output means for movement with respect to said countershafts in a direction substantially perpendicular to the plane including a pair of countershaft axes, means for selectively clutching said output means to one of said driven gears for selectively establishing a driving relationship from said countershafts through one group of countershaft gears, thence to and through the driven gear drivable from said one group for effective driving of said output means, said means for selectively clutching including axially engageable jaw clutches, said jaw clutches comprising first and second axially engageable jaw clutch members, at least one of said jaw clutch elements being constantly resiliently urged axially toward said other jaw clutch element, said one jaw clutch element positively limited in its response to said resilient urging, at least one of said jaw clutches having a blocker associated therewith for preventing axial engagement of said one jaw clutch in the event said blocker is rotationally not aligned with said one jaw clutch member, said improvement comprising:

means effective prior to axial movement of said jaw clutch members towards engagement to automatically cause said blocker to rotationally align with said one jaw clutch member.

26. The improved change gear system of claim 25 where said one clutch member is rotationally fixed to said output and said other clutch member is rotationally fixed to said driven gear.

27. The transmission of claim 25 wherein said blocker is a substantially nondeformable blocker ring surrounding said one clutch member and rotationally carried thereby, said one clutch member comprising at least one first partially removed tooth extending generally radially outwardly toward said blocker ring and said blocker ring comprising at least one first pair of spaced projections extending generally radially inwardly toward said first clutch member, said means comprises a pair of oppositely inclined ramps extending from the axial end of one of said blocker and first clutch member closest said second clutch member and at least one aligning projection configured to be engaged by said ramps, said at least one aligning projection extending from the axial end of the other of said blocker and first clutch member closest said second clutch member, said ramps and at least one aligning projection effect to interact when biased together to limit axial movement of said blocker relative to said first clutch member in the direction toward said second clutch member and to tend to rotate said blocker relative to said first clutch member to align said blocker with said first clutch member, and biasing means for biasing said blocker toward said second clutch member, said ramps and said at least one aligning projection having a circumferential clearance therebetween when axially separated whereby said blocker ring will rotate relative to said first clutch member, by a predetermined, limited degree, said blocker ring tending to rotate with the second clutch member at the initiation of a clutch engaging operation, the space between the projections of said first pair of projections sufficient to permit passage of said first partially removed tooth when aligned therewith, said blocker effective to sense non-synchronous rotation of said clutch members corresponding to blocker ring rotation relative to said first clutch member sufficient to cause said first partially removed tooth not to align the space between the first set of projections to block relative axial engagement of said clutch members.

28. The transmission of claim 27 wherein said first clutch member is axially biased toward said second clutch member, said first clutch member is positively limited in axial movement toward said second clutch member and said second clutch member is selectively axially movable toward said first clutch member, said blocker axially movable with said second clutch member in the direction toward said first clutch member whereby axial movement of said second clutch member toward said first clutch member will cause axial separation of said ramps and said at least one aligning projection.

* * * * *